Figure 1:
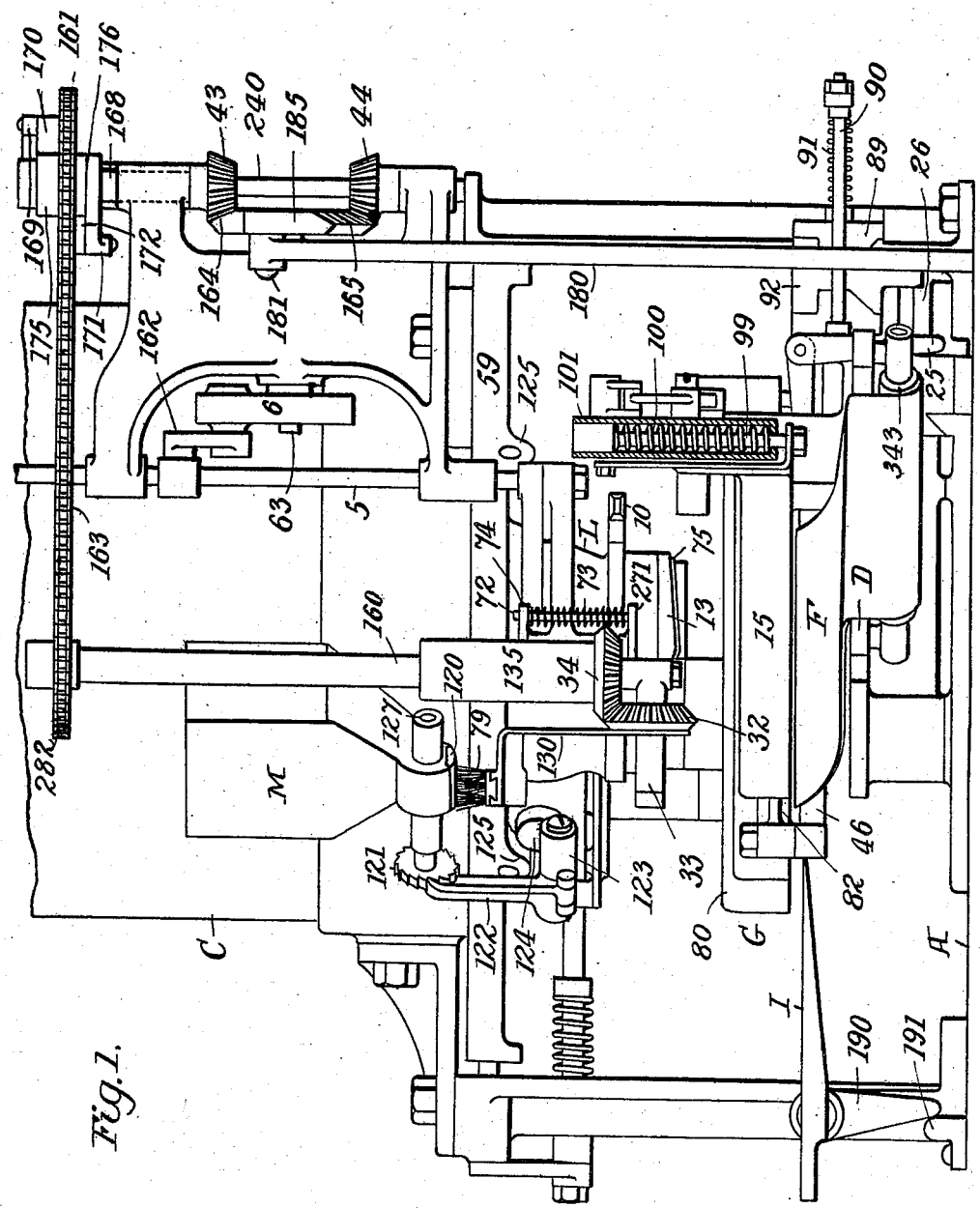

No. 867,825. PATENTED OCT. 8, 1907.
T. MOESINGER.
CIGAR MACHINE.
APPLICATION FILED JUNE 17, 1903.
10 SHEETS—SHEET 1.

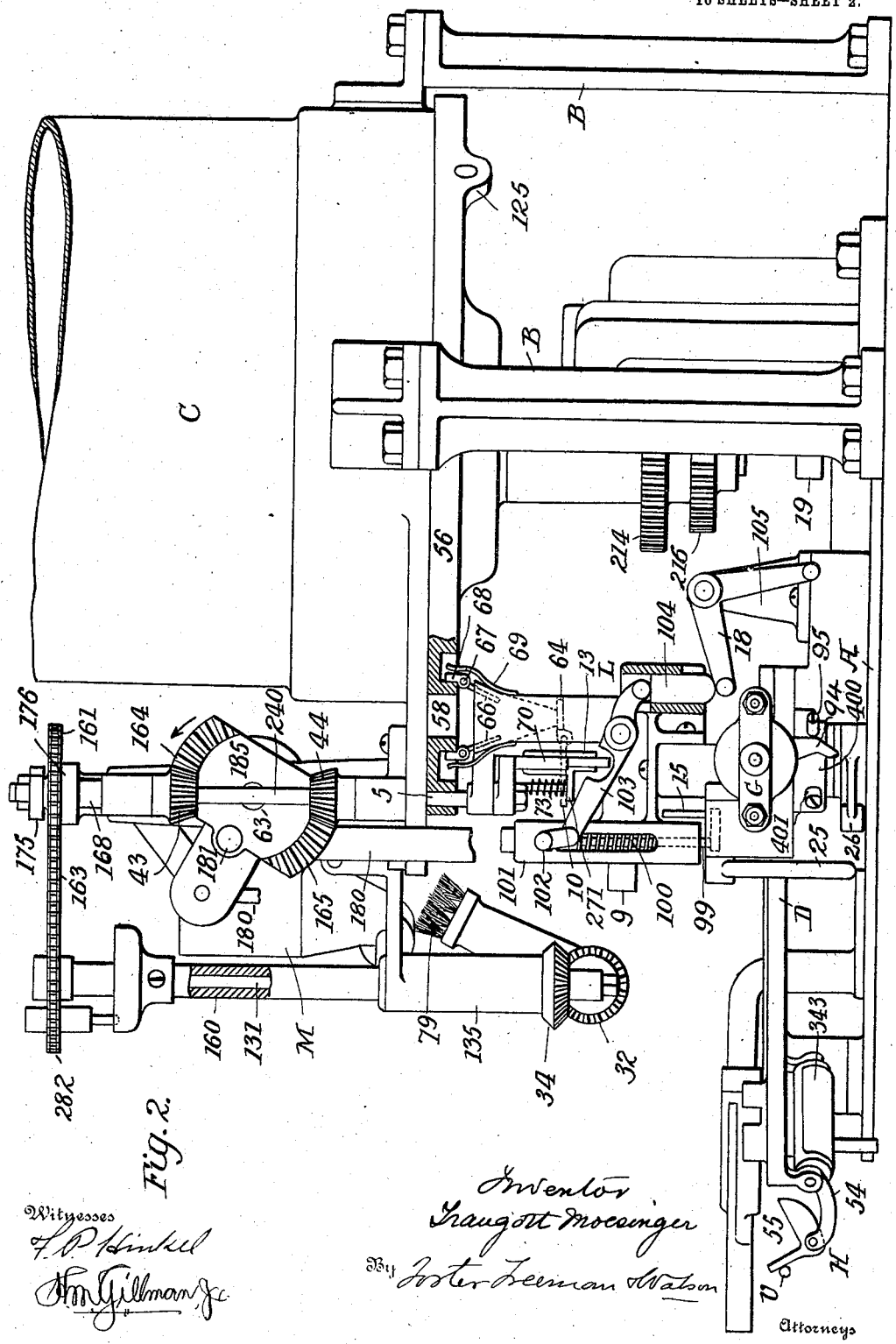

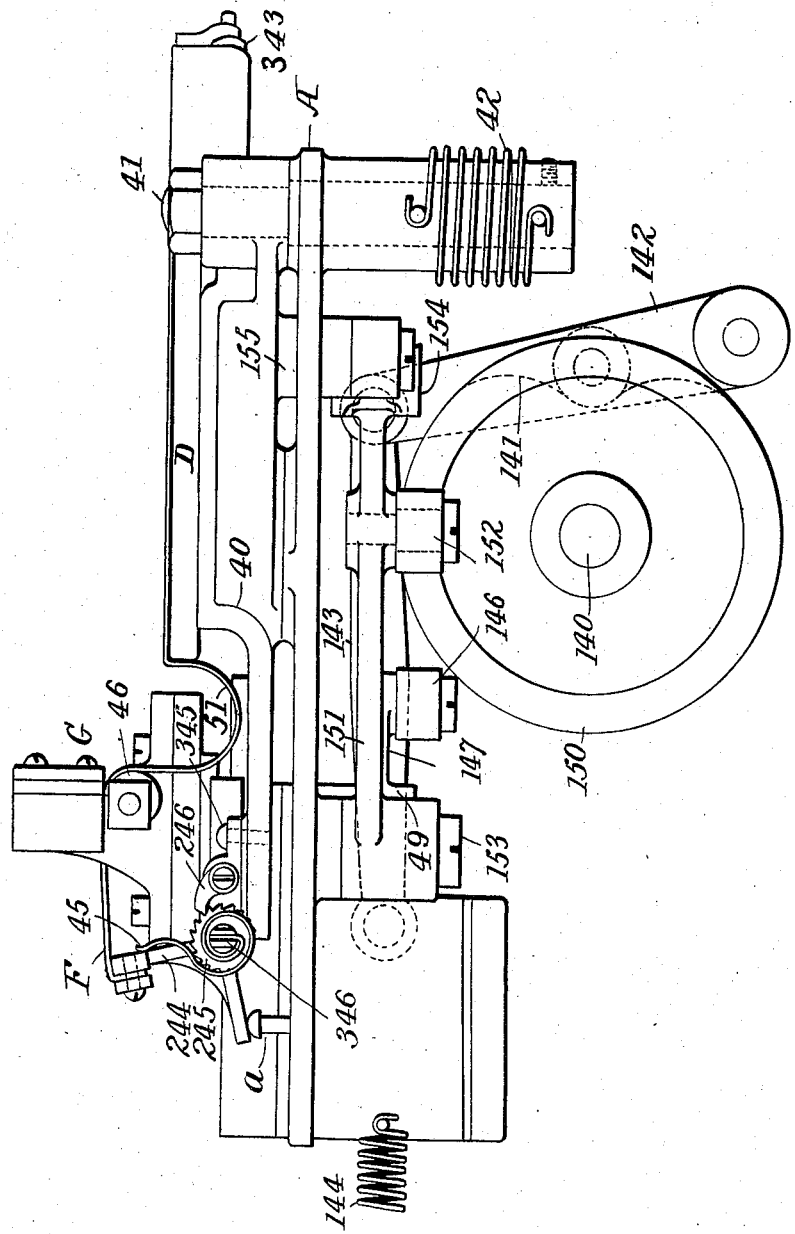

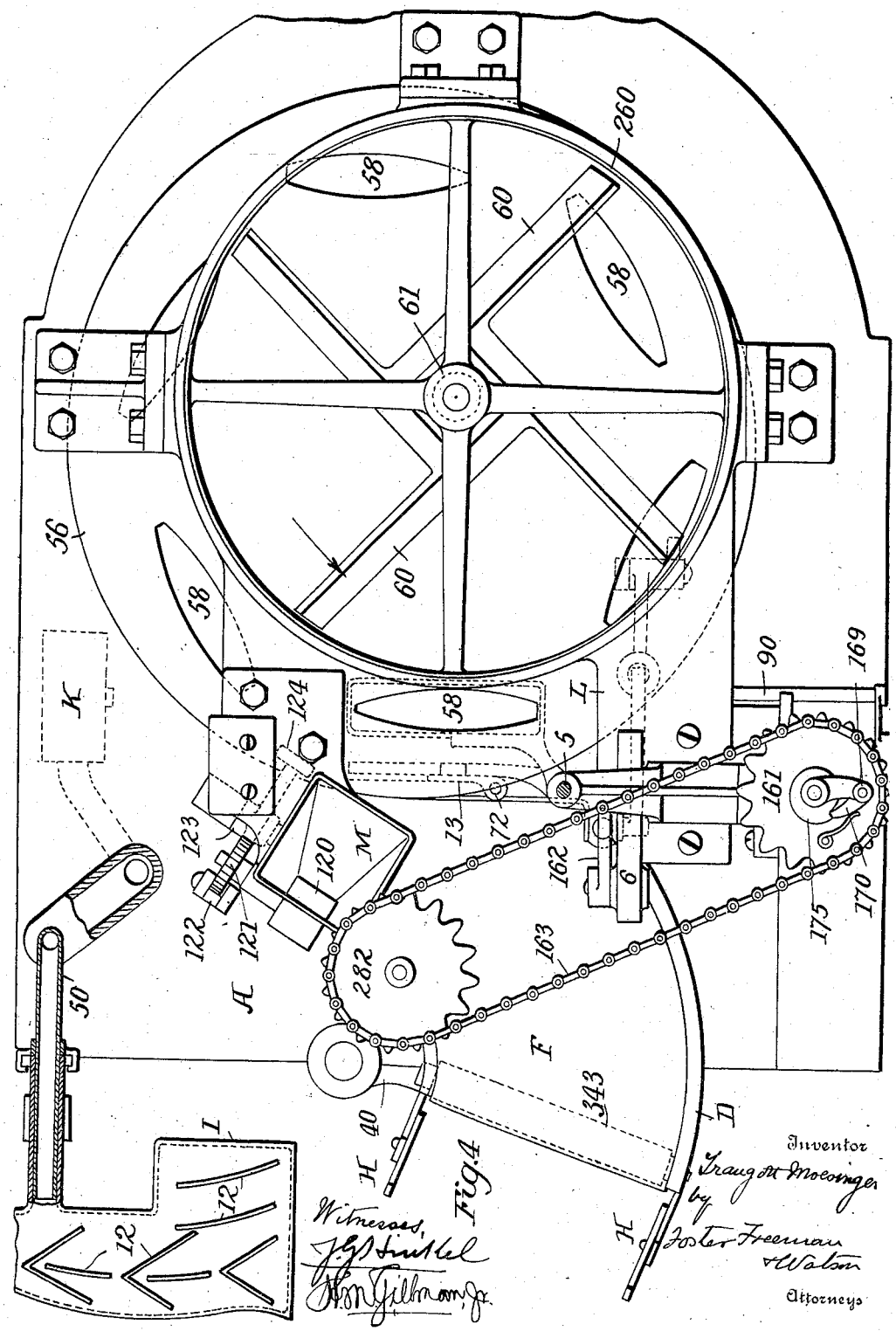

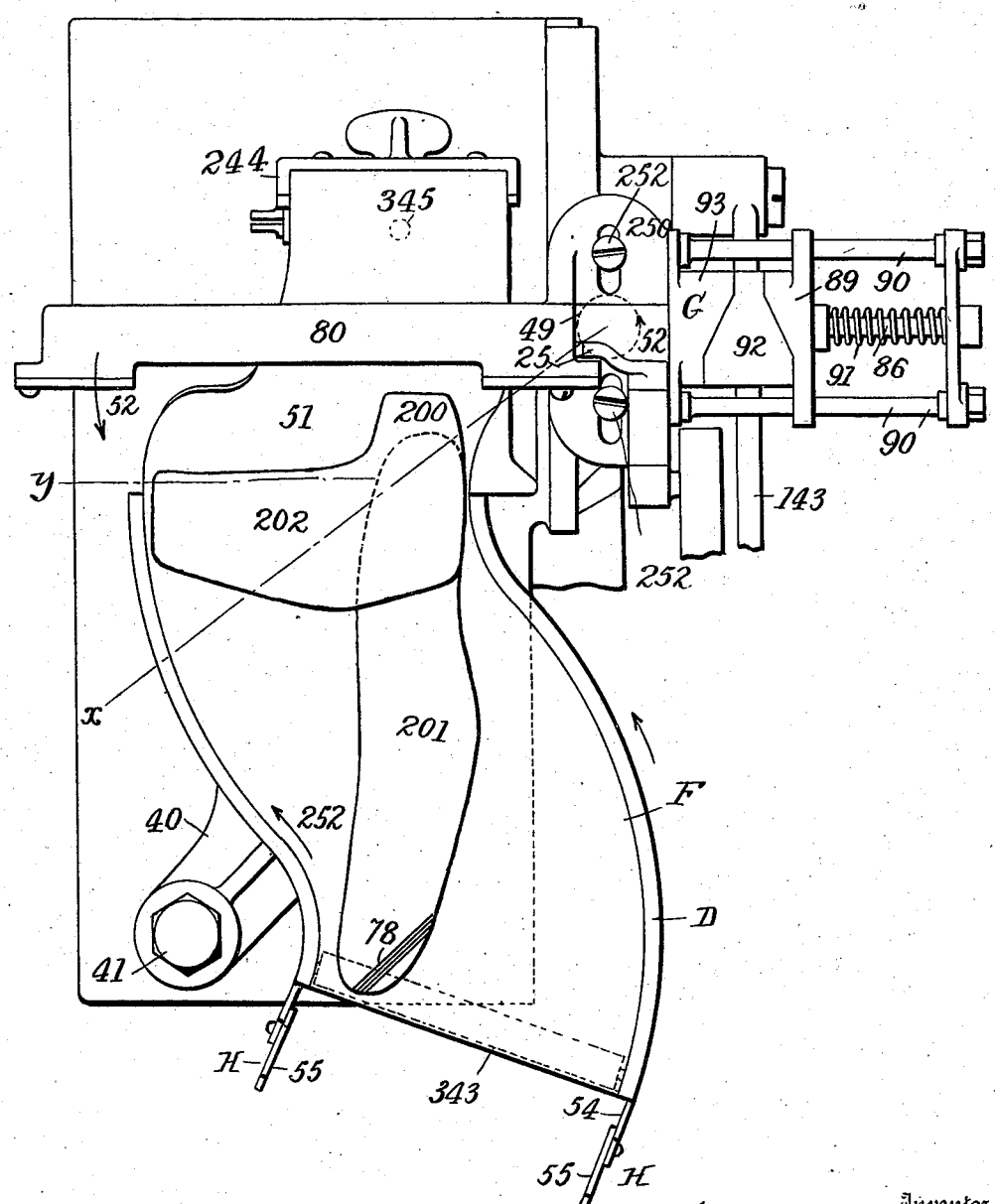

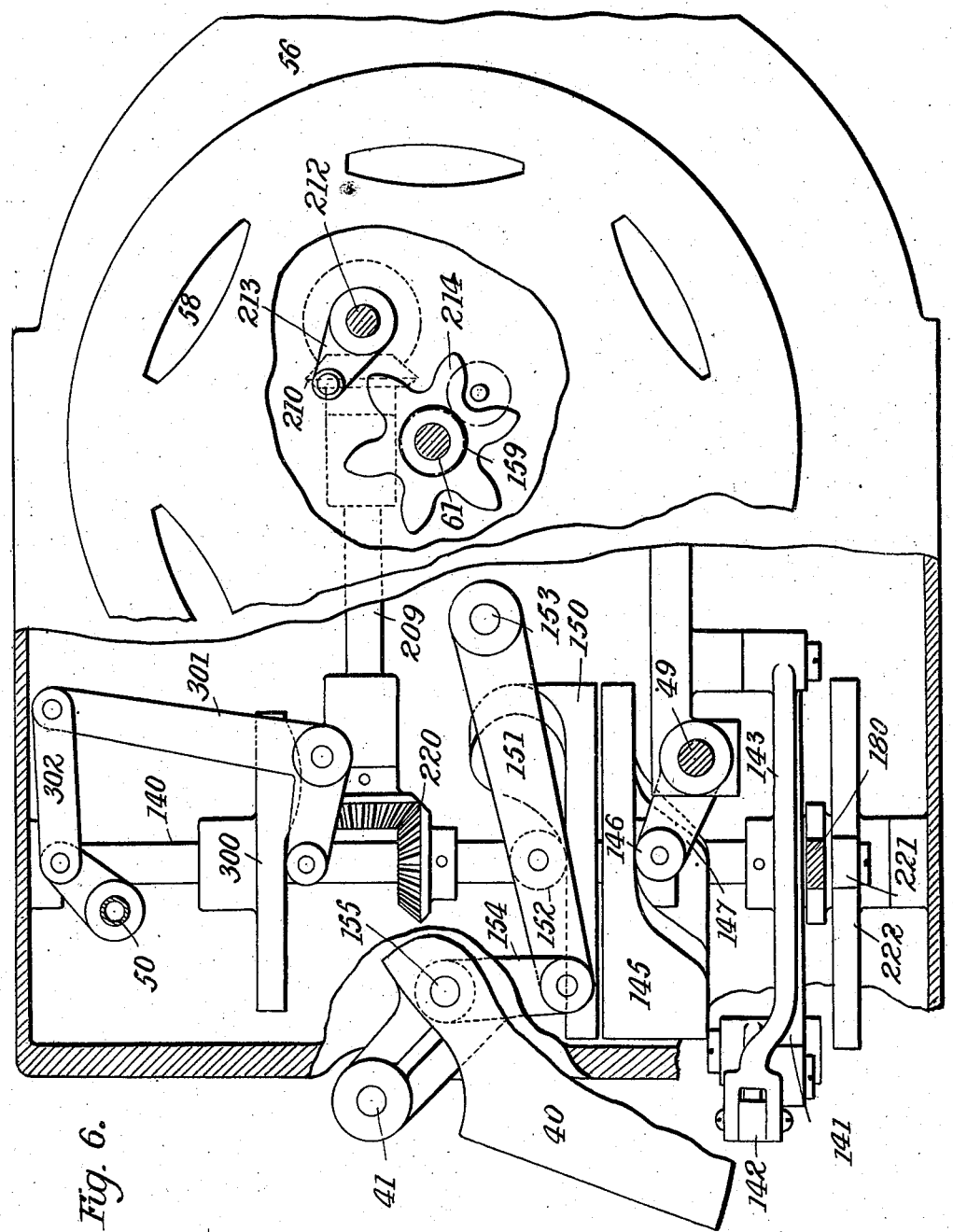

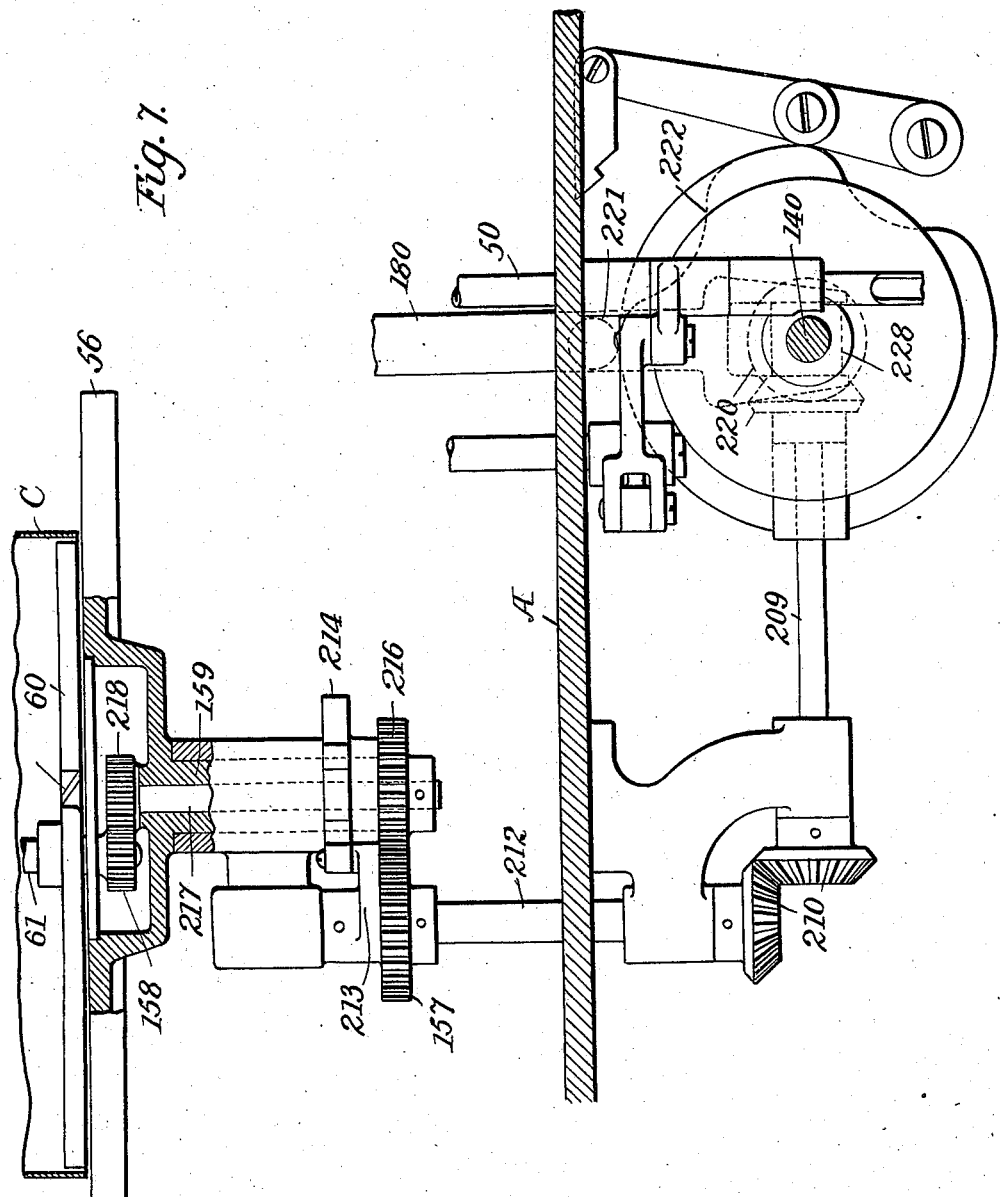

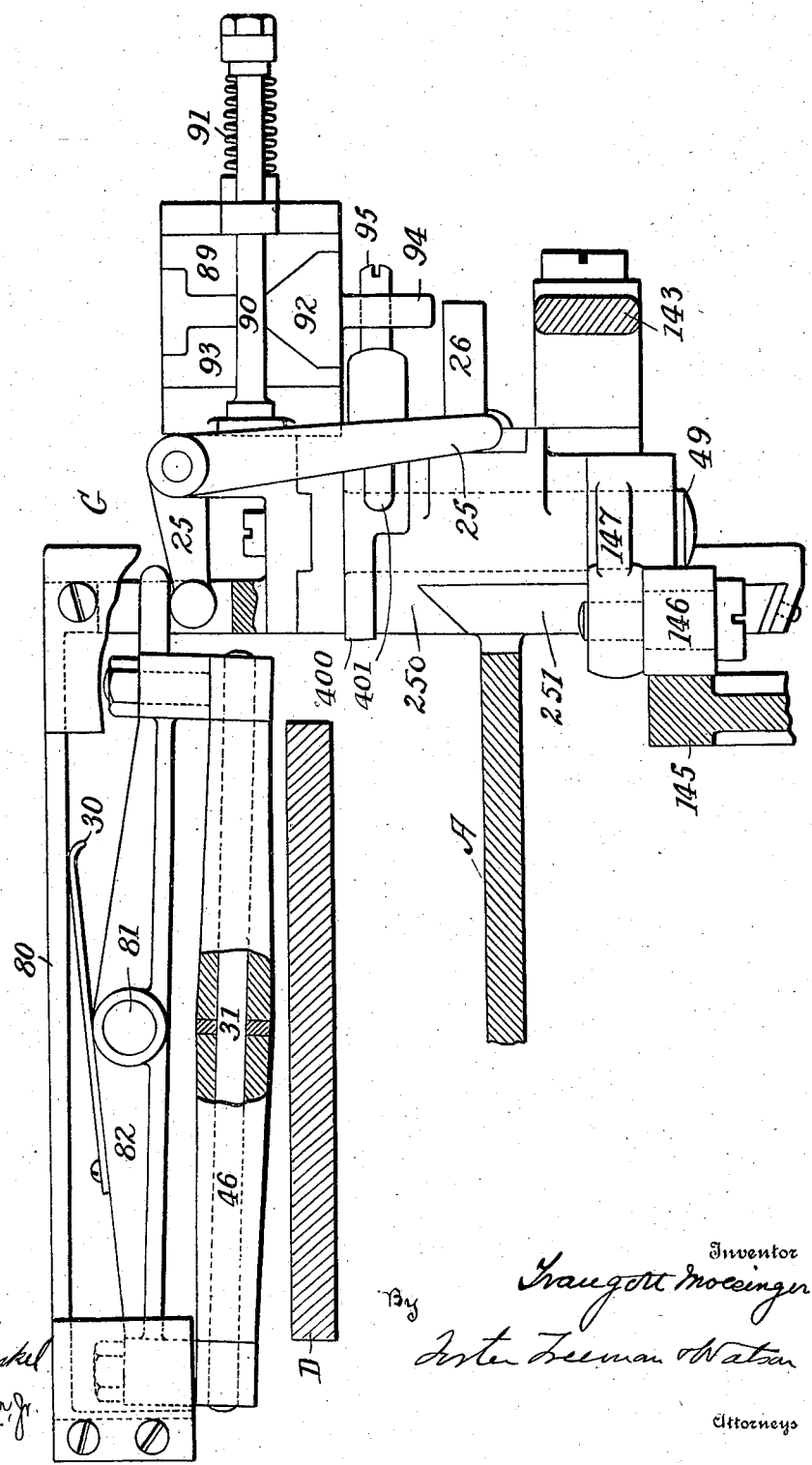

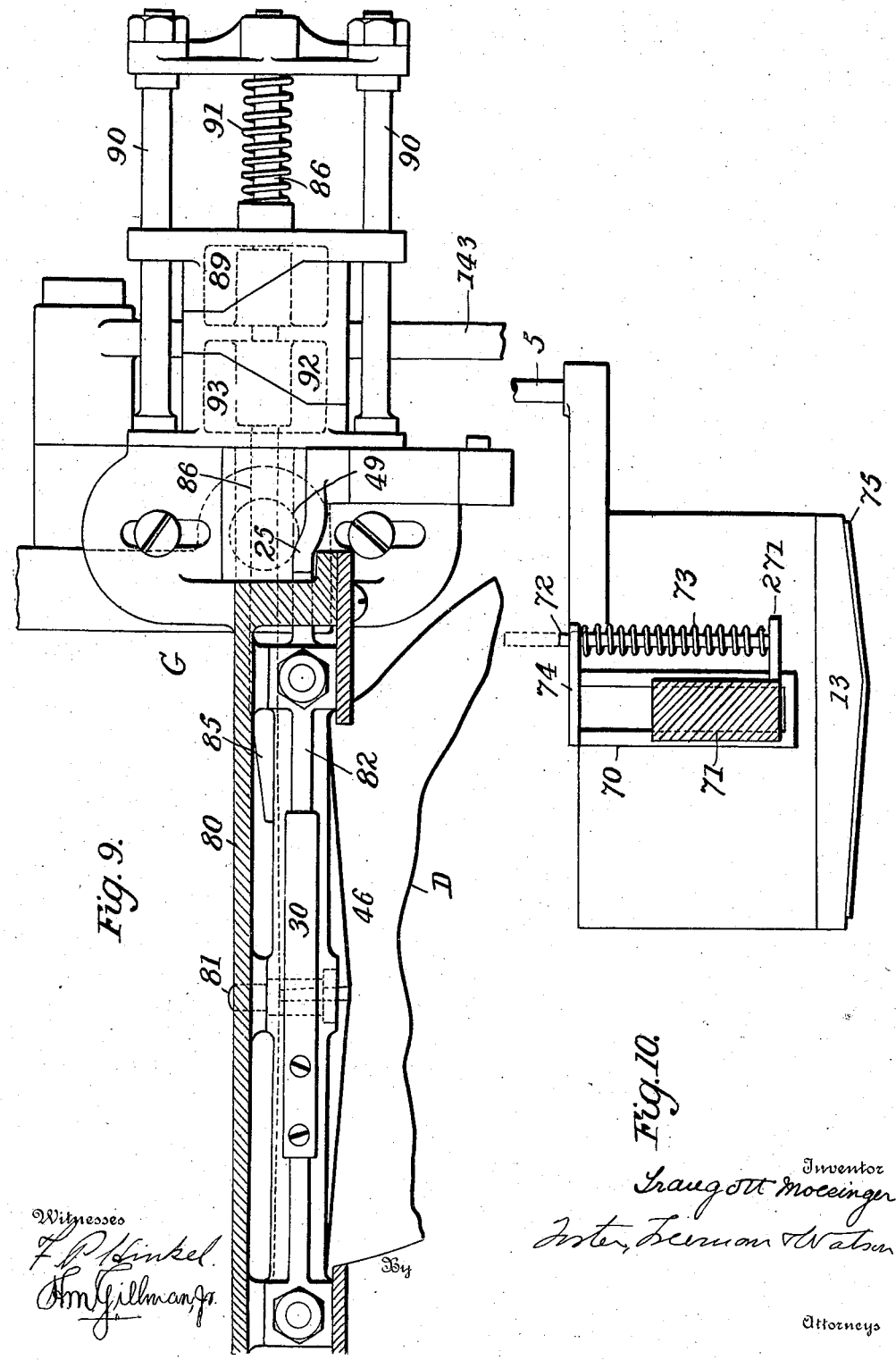

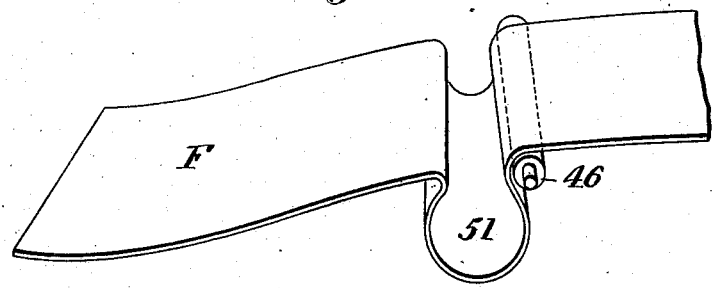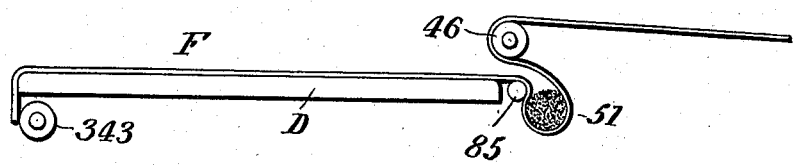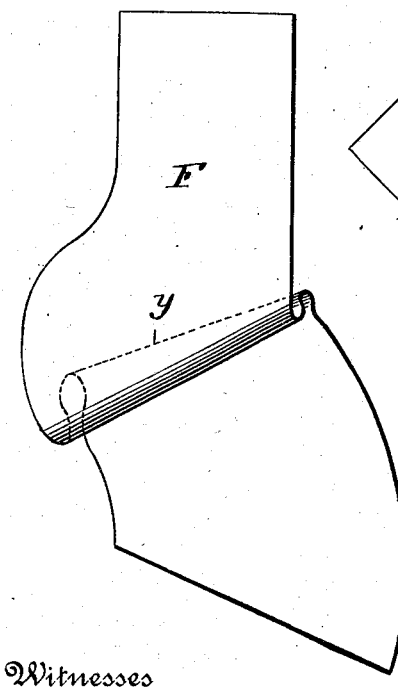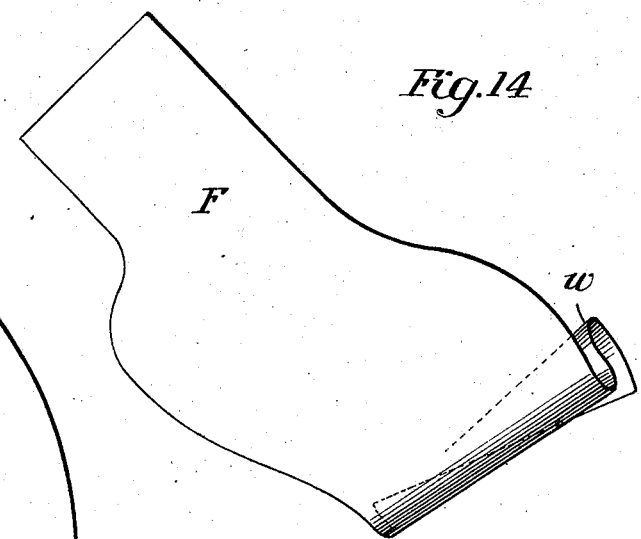

UNITED STATES PATENT OFFICE.

TRAUGOTT MOESINGER, OF BROOKLYN, NEW YORK.

CIGAR-MACHINE.

No. 867,825.　　　Specification of Letters Patent.　　　Patented Oct. 8, 1907.

Application filed June 17, 1903. Serial No. 161,909.

*To all whom it may concern:*

Be it known that I, TRAUGOTT MOESINGER, a citizen of the United States, residing at Brooklyn, in the county of Kings and State of New York, have invented certain new and useful Improvements in Cigar-Machines, of which the following is a specification.

My invention relates to machines especially adapted for making cheroots, although features of the same may be used in making and wrapping other articles, and my invention consists in a machine in which the tobacco is deposited in the fold of an apron and the fold is contracted and the apron operated so as to condense the tobacco, contract the ends of the mass and apply and secure a binder and wrapper, as fully set forth hereinafter and as illustrated in the accompanying drawings, in which—

Figure 1 is a front elevation of my improved machine showing the parts above the table; Fig. 2, a right side elevation in part section; Fig. 3, a left side elevation of part of the machine the parts above the apron and its supports being removed; Fig. 4, a plan in part section; Fig. 5, a plan showing part of the devices that more directly coöperate with the apron and swinging platform; Fig. 6, a sectional plan showing mainly the operating shaft, cams &c.; Fig. 7, a longitudinal section from the left of the machine, showing the parts more directly connected with the hopper; Fig. 8, a transverse section on a larger scale, showing the swinging frame and roller and adjuncts; Fig. 9, a sectional plan of the parts shown in Fig. 8; Fig. 10, a front elevation of the box and parts connected therewith; Fig. 11, a perspective view illustrating the apron and the manner in which the pocket is formed; Fig. 12, a side view illustrating the apron with the parts in a different position; Fig. 13, a plan of the apron as it is folded by the swinging of the frame and its roller; Fig. 14, a plan of the apron as it is folded by the movement of the platform.

On the table A rests a frame B supporting an elevated hopper C and between the table and hopper are the devices for forming and covering the cheroot. A reversely curved horizontal platform D is carried by a frame 40, supported by a pivot shaft 41 extending through and turning in a socket in the table and about concentric with the outer curve of the platform. The platform carries an apron F, of approximately corresponding shape, but longer, the front end connected with a take-up roller 343, Figs. 3, 4 and 5, carried with but below the platform, and the rear end clamped to a bracket 244 pivoted by a horizontal bolt 346 to a plate $40^a$ resting on the frame 40, Fig. 3, which bracket may swing slightly forward against the tension of an adjustable spring 45 carried by a ratchet wheel 245 engaged by a dog 246. The plate $40^a$ is also adjustable upon a bolt 345, Fig. 3, dotted lines, extending into the frame 40 so as to swing horizontally so that if the apron stretches more on one side than the other, the bracket may be set to take up the slack and then fastened. A pin $a$ by contact with an arm of the bracket 244 determines the amount of slack in the fold of the apron when the fold is in position to receive the tobacco. The apron passes over a roller 46 carried by a carriage G which can swing radially about the axis of a vertical supporting shaft 49, which axis is substantially concentric with the inner curve of the platform when the roller 46 is over the platform, as in Fig. 12. The shaft 49 is carried by a bracket 250 slidably supported on a way or track 251 rigidly secured to the table A, see Fig. 8, and the carriage may thus have also a sliding movement back and forth on the table. At the front of the platform at each side are cutters H. A leaf carrier 1, Fig. 4, is supported by a swinging hollow bracket 50 and is hollow and has slits 12 so that a wrapper leaf placed on the same will adhere thereto under the action of air exhausted from the bracket carrier by means of a fan or other exhauster K, dotted lines Fig. 4. It will be seen that when the carriage G is in its rear position, Figs. 3 and 5, the apron sinks beyond the platform D forming a pocket 51 into which a mass of loose tobacco may be deposited from the hopper. Before referring further to details of the apparatus, the operations of these parts will be described.

A wrapper 201, Fig. 5, is placed on the carrier 1 below a binder 202, tobacco is deposited in the pocket 51 when the carriage G will move to a position above the platform D, and the leaf carrier will then present the ends of the wrapper and binder beneath the roller 46, and will swing back and leave them on the apron in the position shown in Fig. 5, a suitable device being employed to hold them on the apron when the carrier returns, as will be hereinafter described. As the roller 46 moves toward the platform D, it doubles the apron over the platform, closing the pocket about the tobacco carrying the apron to the position shown in Fig. 12; the carriage G then swings in the direction of the arrow 52, Fig. 5, to an angle of about 45° to the front of the table, the pocket 51 being thus contracted as shown in Fig. 13, at the side which forms the head of the cheroot and condensing this end in the fold $y$ back of the roller, Fig. 13. The platform D now swings backward in the direction of the arrow 252, Figs. 5 and 14, drawing the apron, contracting the pocket at $w$, Fig. 14, at the left, and condensing the tip or mouth end of the cheroot. During the contraction of the pocket, first at one side and then at the other, and the drawing of the apron, the latter acts with a rolling action on the tobacco to reduce the dimensions of the mass, taper its ends and simultaneously carry the leaf around the mass until the end of the wrapper is brought onto the body to which it is pasted.

As the front end of the platform passes below the roller 46, the cheroot drops out of the pocket, and is caught by the knives 54 of the cutters and the ends are then sheared off by the closing of the knives 55, as they each strike a stop b, Fig. 2, suitably supported when the finished cheroot will fall into a suitable receptacle.

The details of the various devices will now be described.

*The hopper.*—This consists of a casing 260, Fig. 4, having a revolving bottom 56 with a series of recesses 58 arranged in a circle eccentric to the center of the casing, so that they pass below the latter and are filled with tobacco, and then pass from below the casing to a position in front of the casing, the bottom plate being arrested as each recess comes to the said position. The bottom plate 56 is provided beneath each recess with two hinged closing doors 66, Fig. 2, carried by rock shafts 67 having weighted arms 68 which tend to keep the doors upward in a closed position. Within the hopper are radial inclined blades 60 carried by a sleeve 61 which serve to force the tobacco into the recesses.

*The box.*—The box L is carried by a vertical rod 5, Figs. 1, 2 and 4, to which an up and down motion is imparted by a crank arm 6 and link 162 from a rock shaft 63. The sides of the box converge and the bottom is a door 64 on a shaft provided with an arm 10, dotted lines, Fig. 2. The box has arms 69 so arranged that as the box reaches its upper position the arms 69 will strike the arms 68, rock the shafts 67 and open the doors 66 allowing the tobacco to fall into the box, the doors 66 closing as the box descends. The box descends when the parts are in the position shown in Figs. 3 and 5, its front side in the rear of the back end of the platform D, and the arm 10 then strikes a stop 9, Fig. 1, on the carriage G when the door 64 will be opened and the tobacco will drop into the pocket 51 of the apron. At the front of the box L slides vertically a clamp plate 13, Figs. 1, 2, 10, guided by a loop 70 in front of the box in which slides a block 71 on the plate. A lug 271 on the plate carries a pin 72, and a spring 73 between the lug and a projection 74 of the loop 70 serves to depress the clamp plate. The latter is brought against the edge of the binder and wrapper as the box descends and clamps them against the apron as the leaf carrier swings back so that they are left on the apron. To afford a better hold, a strip of rubber 75 may be secured to the plate 13 and project below the lower edge thereof.

As the wrapper lies on the apron in the position shown by dotted lines, Fig. 5, paste is applied along the lines 78 by a brush 79.

*The carriage.*—The carriage G has an arm 80, Figs. 5, 8 and 9, in which swings on a pivot 81, a frame 82 carrying the roller 46. Preferably, the latter is in two sections turning independently on a shaft 31 and each preferably tapering toward the outer end. With the swinging frame 82 is combined means for setting the right hand end downward when the roller is carried over the platform and for setting the left hand end downward when the apron is carried under the roller. This causes the roller to draw only on one edge of the apron at a time to contract the pocket at that side, leaving the other side free. A spring 30 tends to tilt the frame one way and the contact of the end of the frame 82 with one arm of a bell crank lever 25, Fig. 8, swings the frame in the opposite direction when the lever 25 is rocked as the other arm of the lever 25 strikes a stop 26 on the main frame To facilitate the contraction of the pocket which forms the head of the cheroot, a movable pin 85 is employed, Fig. 9. This pin is tapering and is part of, or is a sleeve turning on a rod 86 and carried longitudinally therewith as the roller takes the position of the dotted line, Fig. 5, so as to bear on the outside of the fold of the apron where it incloses the filler and draw it tighter round the filler near this edge of the apron and the thickness of the mass of tobacco is thus reduced. This inward movement of the pin is secured as follows: The pin 85 is secured to a cross head 89 sliding inward on guide rods 90 under the action of a spring 91 and carried outward by a rock cam 92 having diverging edges as shown in Fig. 9 and turning on the pin 85 with cam edges engaging those on the cross head and those on a stationary cross-piece 93 so that a slight turning of the cam will result in an extended and quick longitudinal motion of the pin for a short time, the pin being carried to the position shown in Fig. 12 to thereby temporarily contract the fold of the apron. The cam is rocked by the contact of an arm 94 thereof, Fig. 8, with a fixed stop 95 on a ring 400 which encircles the shaft 49 and may be turned to carry the pin to any desired position and then secured by a set screw 401. The arm strikes the stop 95 as the carriage completes its swing toward the position shown by dotted lines, Fig. 5. The spring 91 bearing on the crosshead 89 acts to restore the position of the cam and pin as the arm 94 moves from the stop pin 95. As the parts resume their places after forming a cheroot, it is necessary to depress the apron to form the pocket 51, Figs. 3 and 11, and this is effected by depressing a blade 15, Fig. 1, just back of the rear edge of the platform D when the latter is in forward position. The blade 15 is supported by the carriage G and is connected at one end to a vertical rod 99 extending through a box 101 containing a spring 100 coiled round the rod, the head of which bears on the spring which lifts the rod and blade. A pin 102, Fig. 2, extends through a slot in the box and is connected to a lever 103, the opposite end of which bears on a sliding block 104 resting on one arm of a bell crank lever 18 pivoted to a bracket 105 on the carriage. As the latter reaches its rear position, the other arm of the lever strikes a stop 19 and the blade 15 is depressed.

*The paster.*—The paste is contained in a pot M, Figs. 1 and 2, which contains a roller 120 projecting partly through an opening at the lower end and rotated step by step by a ratchet 121 and pawl 122, the latter pivoted to a lever 123 having at the inner end a roller 124 with which lugs 125 on the bottom plate 56 of the hopper C make intermittent contact as the plate rotates.

The brush 79 is carried to wipe against the roller 120 by an arm 130 carried by a bevel gear 32 turning on a stud 33 at the lower end of a vertical shaft 131 passing through a bracket 135 at the lower end of which is a stationary gear 34 which engages the gear 32. As the shaft 131 makes a rotation, the gear 32 is rotated, carrying the arm 130 with it and the stud 33 is also revolved so that the brush, the arm 130 of which is carried with the stud and gear 32, travels with a rapid action in a sort of ellipse sweeping diagonally across the end of the wrapper lying on the apron.

*Actuating mechanism.*—While different means may be employed for imparting movements to the above described parts which also may be constructed in different ways, the means shown are effective in practical operations. The movements are all imparted from a main driving shaft 140, Figs. 3, 6 and 7, carrying a cam 141 (Fig. 3, dotted lines,) which acts on a swinging arm 142 connected by a link 143 to the carriage. The cam 141 through the arm 142 and link 143 slides the carriage from the position shown in Fig. 3 to that indicated by the line y, Fig. 5, then the cam 145 through the arm 147 swings the carriage against the action of a spring (not shown) and the spring 144, Fig. 3, slides the carriage back to its original position.

The swinging movement of the carriage is effected by a cam 145 Fig. 6, on the shaft 140, and against the face of which cam bears a bowl 146 on an arm 147 on the shaft 49, the bowl being carried into working position opposite the cam when the carriage G moves back to the position shown in Fig. 6.

The platform D is operated in one direction by a cam 150 bearing on a bowl 152 on an arm 151 swinging on a stud 153 and connected by a link 154 to a stud 155 projecting through a curved slot in the top of the table from the bottom of the frame 40, that carries the platform. The platform is swung in the other direction by a spring 42, Fig. 3, connected at one end to a fixed point and at the other to the shaft 41.

At the start, the apron is in the position shown in Figs. 3 and 11. The tobacco is then deposited in the pocket of the apron and the carriage G moves forward until the axis of the roller 46 is above the rear edge of the platform D, as indicated by the dotted line y, Fig. 5. The carriage G then swings, bringing the axis of the roller 46 to the position indicated by the dotted line x, Fig. 5, after which the platform D swings in the direction of the arrow 252 until its front edge passes below the roller 46 and the roll is delivered over said edge.

The shaft 61 carrying the blades 60 in the hopper also carries a gear 158, Fig. 7, which engages a gear 218 on a shaft 217 turning in a sleeve 159, and at the lower end of the shaft 217 is a gear 216. These parts are driven from the shaft 140 through the medium of a shaft 209 and bevel gears 220, 210, Figs. 6 and 7. The gears 210 rotate a vertical shaft 212 which carries an arm 213 that on each revolution moves one step a star wheel 214 on the sleeve 159 carrying the plate 56. Gear 157 drives the gear 216.

The brush shaft 131 passes through a fixed sleeve 160, Fig. 2, and is rotated from the shaft 63 through the medium of two sprockets 161, 282, and a sprocket chain 163. The shaft 63 carries a plate 185 with two racks 164, 165, one engaging a bevel pinion 44 on the vertical shaft 240 supporting loosely the sprocket 161 and the other a bevel pinion 43 on a sleeve 168. The shaft 240 carries an arm 169 above the sprocket 161, and the sleeve 168 carries an arm 171 below the sprocket and the arms carry pawls 170, 172, biting reversely on disks 175, 176, at the top and bottom of the sprocket so that when the shaft 240 is rotated in one direction, one of the pawls will carry round the sprocket a part rotation and when the sleeve 168 is rotated in the opposite direction the sprocket will again be turned in the same direction as before, a rotation of the sprocket being thus secured at each movement of the shaft 63. The rocking of the shaft 63 is effected by a reciprocating rod 180 connected to a stud 181 on the plate 185 and having a lower end forked and guided by a block 228 on the shaft 140, Fig. 7, a bowl 221 on the rod 180 bearing on and actuated by a cam 222 on the shaft 140, (Figs. 6 and 7). The rod 180 drops by gravity.

The hollow shaft 50 of the leaf carrier 1 is rocked in one direction by a spring (not shown) coiled around the shaft below the table A, and in the other by a cam 300 on the shaft 140 operating a bell-crank lever 301 connected by a link 302 to an arm on the shaft 50, and the carrier is pivotally connected to the shaft 50 so that its end will swing vertically, see Figs. 1 and 4. When the carrier moves toward the apron the front end of the carrier will drop by gravity onto the apron, and when the carrier is returned an arm 190 on the carrier will contact with a stud 191 on the table, Fig. 1, and swing the carrier to horizontal position.

*The wrapper and binder.*—It has heretofore proved difficult to make mechanically a cheroot or cigar with a properly applied wrapper and binder for the reason that efforts have always been made to first mold or solidify the mass of tobacco. To avoid this, the binder is made with a tongue 200, Fig. 5, which is presented to the loose mass in the apron pocket 51 before the latter is rolled to any extent, while the wrapper 201 is placed at right angles on the binder. As a result, the solidifying and rolling of the mass of tobacco and application of the binder take place at the same time, so that the tobacco is formed and inclosed by the binder by the time the end of the wrapper 201 begins to be wrapped round the same, giving the wrapper a solid support.

Without limiting myself to the construction shown, I claim:

1. The combination with a reversely curved flexible apron, of means for depositing tobacco thereon, means for folding the apron to form a pocket inclosing the tobacco, and means for contracting the curved portions successively at different sides to roll and condense the tobacco at the opposite ends, substantially as set forth.

2. The combination with a reversely curved flexible apron, of means for depositing tobacco thereon, means for folding the apron to form a pocket inclosing the tobacco, means for contracting the curved portions successively at different sides to roll and condense the tobacco at the opposite ends, and means for presenting a binder to receive the tobacco so as to be wound about the latter as it is rolled, substantially as set forth.

3. The combination with a reversely curved flexible apron, of means for depositing tobacco thereon, means for folding the apron to form a pocket inclosing the tobacco, means for contracting the curved portions successively at different sides to roll and condense the tobacco at the opposite ends, and means for presenting a binder to the tobacco to be wound about the same as it is rolled, and means for also applying the wrapper to and winding it about the tobacco, substantially as set forth.

4. The combination with a reversely curved flexible apron, of means for depositing tobacco thereon, a roller round which the apron is carried forward of the point where the tobacco is deposited, and means for securing relative movements of the roller and apron first radially as to one curve and then radially as to the other curve, substantially as set forth.

5. The combination with the table, of a frame 40 pivoted on one side of the table, a reversely curved platform supported by the frame with one of its curved sides substantially concentric with the pivot of the frame, a sliding support on the opposite side of the table, a carriage pivoted to said support, a frame pivoted to said carriage, a roller carried by the said frame, a rolling apron passing over the roller and connected at its ends to the frame which supports the platform, means for swinging the roller carrying frame about its pivot, and means for swinging the carriage about its pivot, substantially as set forth.

6. The combination of a swinging frame supporting a platform, an apron connected at the ends to the frame, a roller extending over the platform and over which the apron is passed, means for carrying the roller over the platform, means for swinging it at an angle thereto, and means for swinging the platform below the roller, substantially as set forth.

7. The combination of a swinging frame supporting a platform, an apron connected at the ends to the frame, a roller extending over the platform and over which the apron is passed, said roller tapering in opposite directions from the center, means for tilting the roller in opposite directions and means for carrying the roller over the platform and the latter below the roller, substantially as set forth.

8. The combination of a swinging frame supporting a platform, an apron connected at the ends to the frame, a roller extending over the platform and over which the apron is passed, said roller made or consisting of two independent sections, means for tilting the roller in opposite directions, and means for carrying the roller over the platform and the latter below the roller, substantially as set forth.

9. The combination of a swinging frame supporting a platform, an apron connected at the ends to the frame, a roller extending over the platform and over which the apron is passed, means for carrying the roller over the platform and the latter below the roller, a tapering pin, and means for moving it to and from a position adjacent to the roller to contract the bend in the apron, substantially as set forth.

10. The combination of a swinging frame supporting a platform, an apron connected at the ends to the frame, a roller extending over the platform and over which the apron is passed, means for depressing the apron beyond the rear end of the platform to form a pocket, and means for carrying the roller radially over the platform and the latter radially below the roller, substantially as set forth.

11. The combination of the swinging platform, an apron supported beyond the end of the platform to swing therewith, means for depressing the apron to form a pocket beyond the platform, a carriage supporting a roller over which the apron passes, and means for carrying the roller to and over the platform and for swinging it about a pivot above the same, substantially as set forth.

12. The combination of the platform, an apron supported beyond the end of the platform, means for depressing the apron to form a pocket beyond the platform, a carriage supporting a roller over which the apron passes, means for carrying the roller to and over the platform and for swinging it above the same, and means for swinging the platform below the roller, substantially as set forth.

13. The combination with the platform, an apron carried thereby, and a carriage movable above the platform, of an arm extending from the carriage, a swinging frame carried by said arm, and a roller carried by said frame, the apron connected at one end to the platform and passing over the roller, substantially as set forth.

14. The combination with the platform, an apron carried thereby, and a carriage movable above the platform, of an arm extending from the carriage, a swinging frame carried by said arm, and a roller tapering toward both ends and carried by the frame, the apron being connected at one end to the platform and extending over the roller, substantially as set forth.

15. The combination with the platform, an apron carried thereby, and a carriage movable above the platform, of an arm extending from the carriage, a swinging frame carried by said arm, and a roller in two sections tapering toward both ends and carried by the frame, the apron being connected at one end to the platform and extending over the roller, substantially as set forth.

16. The combination with a vertically reciprocating box L, a platform below the same, an apron carried by the platform, and means for depositing a leaf on the apron, of a clamping plate carried by the box for clamping the leaf to the apron, substantially as described.

17. The combination with the platform, apron, and box L, of a hopper, means for carrying the box vertically between the apron and the hopper, a plate provided with recesses pivoted to turn below and to carry the recesses between the hopper and box and beyond the hopper, doors below the recesses, and means for opening the doors when the box is below the same, substantially as set forth.

18. The combination with the platform, apron and box L, of a hopper, a plate provided with recesses, pivoted to rotate below and to carry the recesses below and beyond the hopper, doors below the recesses, and inclined blades revolving within the hopper above said recesses, substantially as set forth.

19. The combination of the platform, apron carried thereby, carriage G, arm, roller round which the apron is folded, pin 85, and means for carrying said pin into and from the fold of the apron, substantially as set forth.

In testimony whereof I have signed my name to this specification in the presence of two subscribing witnesses.

TRAUGOTT MOESINGER.

Witnesses:
JOHN WINTER,
GEORGE PHILLIPS.